United States Patent
Takeda

[19]
[11] Patent Number: 6,129,541
[45] Date of Patent: *Oct. 10, 2000

[54] VALVE GATE DEVICE FOR AN INJECTION MOLD

[75] Inventor: Yoshinobu Takeda, Niigata, Japan

[73] Assignee: Mitsubishi Materials Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/038,835

[22] Filed: Mar. 12, 1998

[30] Foreign Application Priority Data

Feb. 13, 1998 [JP] Japan .................................. 10-031869

[51] Int. Cl.⁷ .................................................. B29C 45/23
[52] U.S. Cl. ........................ 425/564; 264/328.9; 425/566
[58] Field of Search .................................. 475/146, 171, 475/564, 566; 264/40.5, 40.7, 328.9

[56] References Cited

U.S. PATENT DOCUMENTS 4,826,641  5/1989  Takeda et al. .
4,882,117  11/1989  Takeda et al. .
5,055,026  10/1991  Gordon ................................... 425/146

FOREIGN PATENT DOCUMENTS 2-243314  9/1990  Japan .
10-15995  10/1998  Japan .

*Primary Examiner*—Tim Heitbrink
*Attorney, Agent, or Firm*—Oblon, Spivak, McClelland, Maier & Neustadt, P.C.

[57] ABSTRACT

In a valve gate device and an injection mold provided with the valve gate device, a movable pin moves easily in order to properly open and close the gate, thereby preventing damage to the valve gate device and the mold. A movable pin 17 is made more durable by using a harder material for the movable pin 17 than for a valve body 11, and a slight distance can be maintained between the movable pin 17 and the valve body 11 by making the thermal expansion coefficient of the movable pin 17 smaller than that of the valve body 11, so that the problem of initial improper movement of the movable pin 17 can be eliminated.

3 Claims, 1 Drawing Sheet

VALVE GATE DEVICE FOR AN INJECTION MOLD

BACKGROUND OF THE INVENTION

1. Field of the Invention

The present invention relates to a valve gate device with a movable pin (valve pin) for opening and closing a gate in an injection mold having a cavity between a pair of mold plates in order to supply resin into the cavity through the gate, and an injection mold provided with the valve gate device.

2. Description of the Related Art

In a conventional injection mold of this type, a cavity is formed between a stationary mold plate and a movable mold plate, and a valve body with a resin-conveying path which communicates with the cavity through a gate is provided within the stationary mold plate. In addition, a movable pin is provided so as to be movable in an axial direction thereof in the resin-conveying path of the valve body, with one end of the movable pin being used for opening and closing the gate. However, in this conventional injection mold the movable pin does not properly open and close the gate since it cannot not move easily when the mold is becoming hot at the start of injection molding.

SUMMARY OF THE INVENTION

The present inventors, have found out that the movable pin does not move easily because it and the mold plates forming the valve body and the gate are made of the same material (such as die steel), so that they have the same thermal expansion coefficient, and because there is resin resistance at the start of injection molding.

In addition, application of resin pressure for injecting resin into the cavity, with the gate kept closed by the movable pin not capable of moving easily, may cause the valve gate device to break. Further, opening the mold with the gate kept opened as a result of failure of the movable pin to close the gate, causes the resin that has leaked out to cool and solidify. The cooled and solidified resin may cause the mold to break during the next molding process.

In view of the above-described problems, it is an object of the present invention to provide a valve gate device, and an injection mold provided with the valve gate device, wherein the movable pin moves easily in order to properly open and close the gate, thereby preventing damage to the valve gate device and the mold.

According to a feature of the invention, there is provided a valve gate device for use in an injection mold having a cavity formed between a pair of mold plates in order to supply resin into the cavity through a gate, the valve gate device comprising a valve body having a resin-conveying path which communicates with the cavity through the gate; and a movable pin for opening and closing the gate, which is disposed within the valve body so as to be movable along an axial line of the movable pin. The movable pin is formed of high-speed tool steel SKH-51 and has a hardness $H_{RC}$ of 60 to 62, and the valve body is formed of hot die steel SKD-6 and has a hardness $H_{RC}$ of 46 to 50.

The movable pin is made more durable by using a harder material for the movable pin than for the valve body, and a slight distance can be maintained between the movable pin and the valve body by making the thermal expansion coefficient of the movable pin smaller than that of the valve body. Therefore, the problem of initial improper movement of the movable pin can be eliminated.

The wear resistance and the lubricity of the movable pin can be increased by applying a titanium coating to the movable pin, thereby making it harder for the resin to stick onto the movable pin as a result of increased wettability of the resin.

The valve gate device is provided at one of the mold plates, and the cavity forming the gate is formed of hardened steel and has a hardness $H_{RC}$ of 52 to 55.

The movable pin can be made more durable by using a harder material for the movable pin than for the cavity forming the gate. In addition, a slight distance can be maintained between the movable pin and the valve body by making the thermal expansion coefficient of the movable pin smaller than that of the cavity forming the gate. Therefore, the problem of initial improper movement of the movable pin can be eliminated.

The valve gate device comprises a valve body having a resin-conveying path which communicates with the cavity through the gate, a movable pin for opening and closing the gate, which is disposed within the valve body so as to be movable along an axial line of the movable pin and detecting means for detecting the position of the movable pin.

When the position of the movable pin is monitored by the detecting means, and the detecting means judges that the movable pin is not at the proper position, the molding process is stopped.

DETAILED DESCRIPTION OF THE PREFERRED EMBODIMENT

Figure 1:
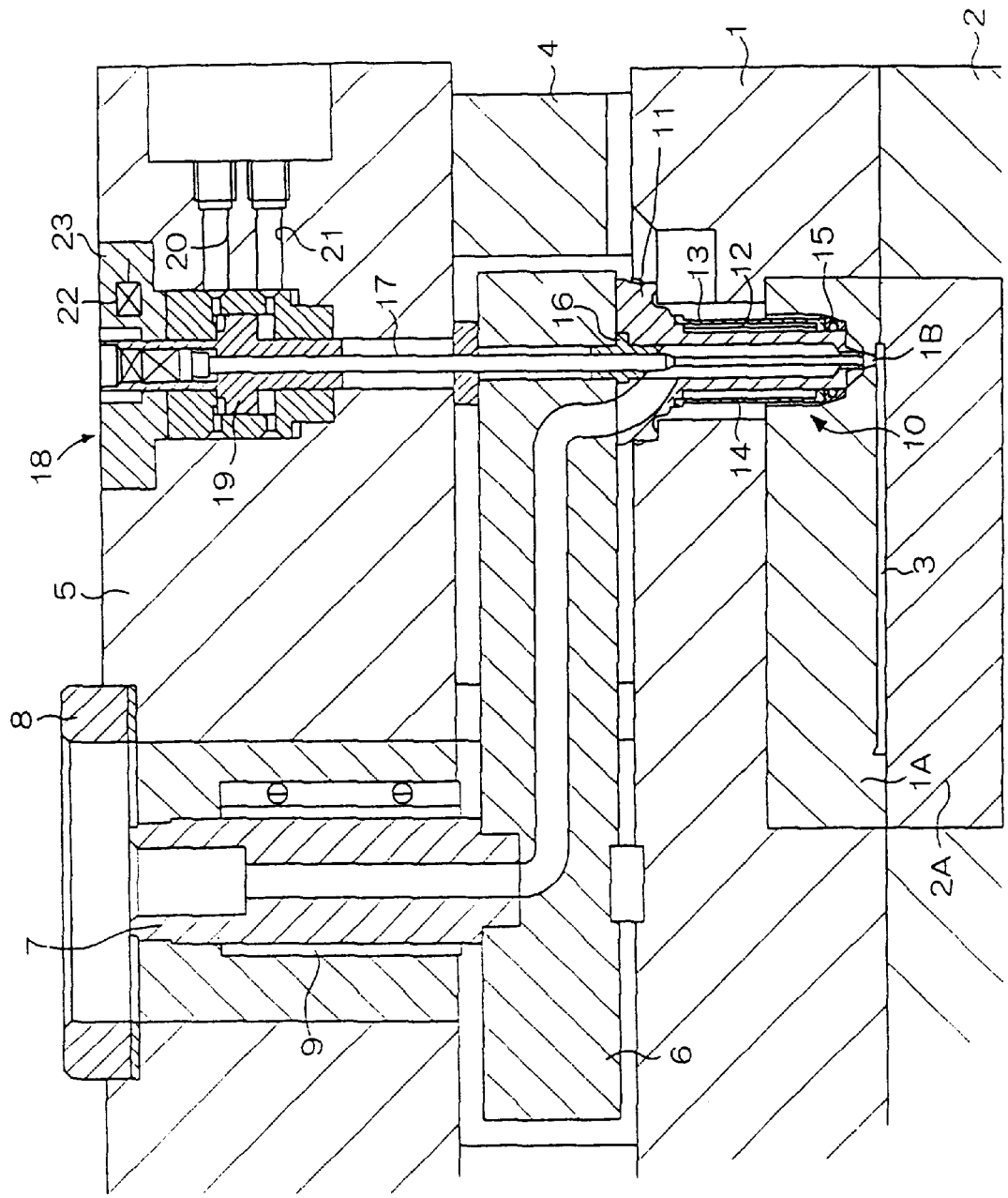
FIG. 1 which is a view showing a hot runner mold.

A description will now be given of an embodiment of the present invention with reference to FIG. 1 in which a movable mold plate 2 can move towards or away from a stationary mold plate 1. Inserts 1A and 2A are provided at the mold plates 1 and 2, respectively. A cavity 3 having the shape of the molded product is formed between the inserts 1A and 2A. A stationary mounting plate 5 is mounted to the stationary mold plate 1 through a spacer block 4, with a manifold 6 disposed between the stationary mold plate 1 and the stationary mounting plate 5. A sprue bush 7 and a locate ring 8 are provided at the stationary mounting plate 5, with a heater 9 provided at the outer periphery of the sprue bush 7. A valve body 11 of a valve gate device 10 is provided within the stationary mold plate 1 and the insert 1A. A temperature sensor 12 and a heater 13 are provided at the outer periphery of one end of the valve body 11. A heater cover 14 is provided at the outer periphery of the heater 13, and a seal ring 15 is provided at one end of the valve body 11. Molten resin is supplied to the cavity 3 by allowing it to pass through the sprue bush 7, the manifold 6, the valve body 11, and pass by the insert 1A.

A closing member 16 is internally provided in the upper portion of the valve body 11. A movable pin 17 supported and guided by the inner portion of the closing member 16 and the inner portion of one end of the valve body 11 is capable of sliding along the axial line thereof The manifold 6 and the stationary mounting plate 5 are inserted into the base end side of the movable pin 17. The base end portion of the movable pin 17 is mounted to a piston 19 of a fluid pressure cylinder 18 provided within the stationary mounting plate 5. A fluid is supplied to the fluid pressure cylinder 18 through two fluid-supplying paths 20 and 21 that are formed in the stationary mounting plate 5, whereby the piston 19 is moved along with the movable pin 17. A proximity switch (detecting means) 22, opposing the base end portion of the movable pin 17 is provided at a stationary portion 23 of the fluid pressure cylinder 18 in order to detect any movement of the movable pin 17.

The movable pin 17 of the valve gate device 10 is made of high-speed tool steel SKH-51 and has a hardness $H_{RC}$ of 60 to 62. A titanium coating (titanium nitride (TiN) coating) is applied to the surface of the movable pin 17 by the CVD method. Therefore, resin does not easily stick onto the surface of the movable pin 17, allowing the movable pin 17 to move easily. In addition, the movable pin 17 has a smaller thermal expansion coefficient than the portions (valve body 11 and the insert 1A) that slidably contact the movable pin 17. Therefore, the movable pin 17 can move easily at the start of molding and has excellent wear resistance and lubricity, so that even when the movable pin 17 is used for a long time, it does not get damaged, thereby making it much more durable.

If by any chance the movable pin 17 cannot move easily as a result of, for example, mixing of an impurity in the resin or a bad molding environment, the movement of the base end portion of the movable pin 17 (or the piston 19) can be detected by means of the proximity switch 22 that emits of a signal indicating an abnormal opening or closing of the gate 1B in order to quickly stop the molding machine. In other words, the movement of the movable pin 17 is judged as abnormal when the base end portion of the movable pin 17 continues to be detected by means of the proximity switch 22, even though the gate close command signal has been generated for a predetermined time, or when the base end portion of the movable pin 17 is not detected by means of the proximity switch 22, even though the gate open command signal has been generated for a predetermined time. As a result, damage to the valve gate device or the mold can be prevented.

As can be understood from the foregoing description, the movable pin can be made more durable by using a harder material for the movable pin than for the valve body. In addition, a slight distance can be maintained between the movable pin and the valve body by making the thermal expansion coefficient of the movable pin smaller than that of the valve body. Therefore, initial improper movement of the movable pin can be eliminated.

The wear resistance and the lubricity of the movable pin can be increased by applying a titanium coating to the movable pin, thereby making it harder for resin to stick onto the movable pin as a result of increased wettability of the resin. Therefore, easy movement of the movable pin can be ensured.

The movable pin can be made more durable by using a harder material for the movable pin than for the mold plate forming the gate. In addition, a slight distance can be maintained between the movable pin and the valve body by making the thermal expansion coefficient of the movable pin smaller than that of the mold plate forming the gate. Therefore, the problem of initial improper movement of the movable pin can be eliminated.

When the position of the movable pin is monitored by the detecting means and a judgment is made that the movable pin is not at the proper position, the molding process can be quickly and reliably stopped so that damage to the valve gate device and mold can be prevented.

What is claimed:

1. A valve gate device for use in an injection mold having a cavity formed between a pair of mold plates in order to supply resin into the cavity through a gate, said valve gate device comprising:

a valve body having a resin-conveying path which communicates with the cavity through the gate; and a movable pin for opening and closing the gate, disposed within said valve body so as to be movable along an axial line of said movable pin, wherein said movable pin is formed of high-speed tool steel SKH-51 and has a hardness $H_{RC}$ of 60 to 62, and said valve body is formed of hot die steel SKD-6 and has a hardness $H_{RC}$ of 46 to 50.

2. A valve gate device according to claim 1, wherein said movable pin has a titanium coating.

3. An injection mold having a cavity between a pair of mold plates in order to supply resin into said cavity through a gate, and a valve gate device comprising:

a valve body having a resin-conveying path which communicates with the cavity through the gate; and a movable pin for opening and closing the gate, disposed within said valve body so as to be movable along an axial line of said movable pin, wherein said movable pin is formed of high-speed tool steel SKH-51 and has a hardness $H_{RC}$ of 60 to 62, and said valve body is formed of hot die steel SKD-6 and has a hardness $H_{RC}$ of 46 to 50, and wherein the material of said cavity at said gate is hardened steel and has a hardness $H_{RC}$ of 52 to 55.

* * * * *